Patented Feb. 21, 1950

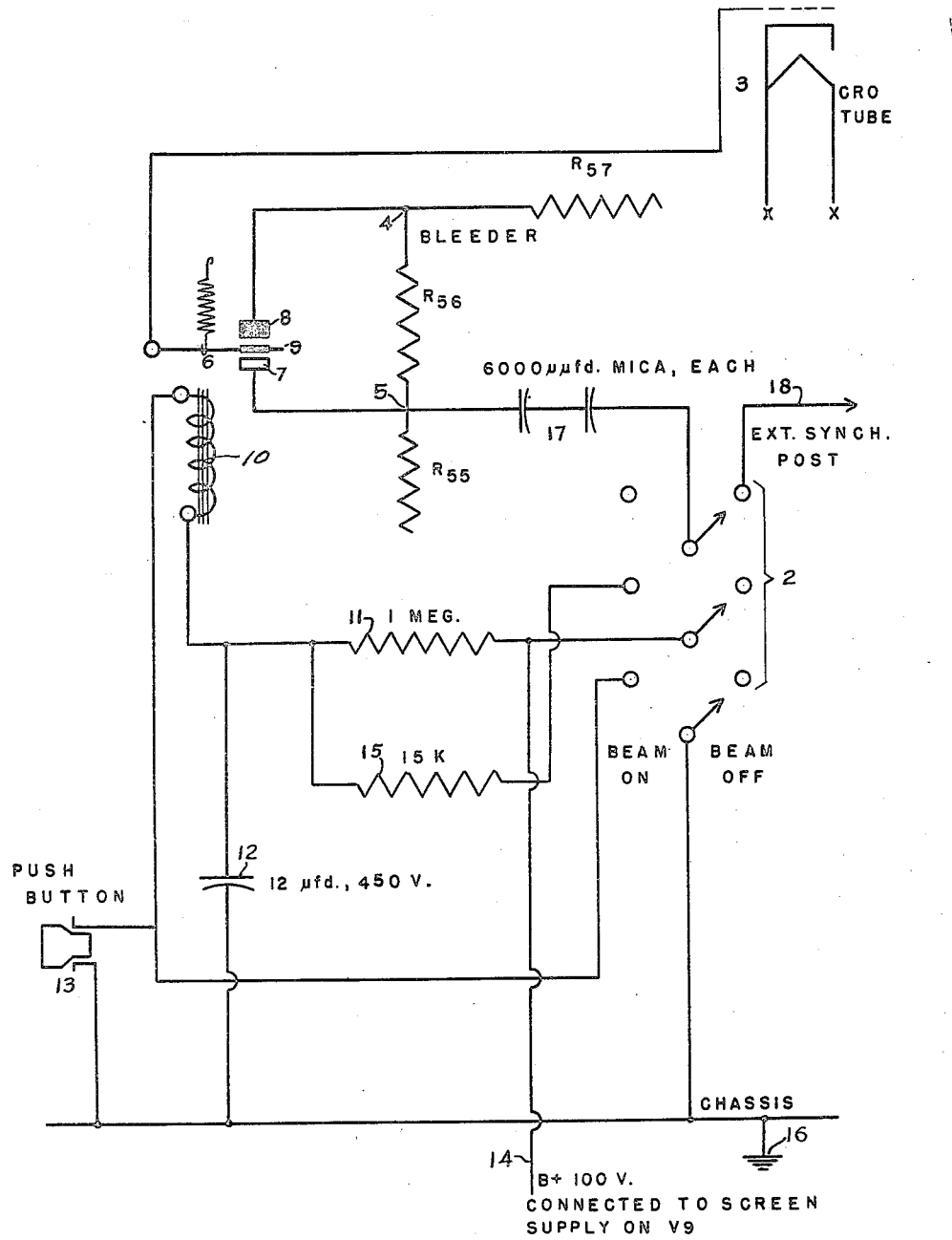

2,498,579

UNITED STATES PATENT OFFICE 2,498,579

BEAM BLANKING AND SWEEP CONTROL

George A. Roberts, Swarthmore, Pa., assignor to the United States of America as represented by the Executive Secretary of the Office of Scientific Research and Development Application January 7, 1946, Serial No. 639,667

6 Claims. (Cl. 315—20)

This invention relates to an improved circuit arrangement and more particularly to a beam blanking circuit for completely eliminating the beam of a cathode ray oscilloscope before and after photographic operations.

Normal operation of a conventional cathode ray oscilloscope produces a blue or green glow (depending on the composition of the screen) before, during and after movement of the beam across the screen, due to a space charge of electrons (consequent on secondary emission) which continually impinge on the screen. This is sufficient to fog a photographic recording of a trace, resulting in poor contrast, if the camera has been trained on the screen for a time with the shutter open, waiting for a transient or triggered sweep. This is possible even if the beam is deflected out of the field focussed on the photographic plate until a sweep is triggered. Also, even if short persistence screens are used, when attempting to photograph one travel or "sweep" of the beam, using a camera with its lens open, difficulty arises from the fact that rapid repetitions of the cycle of the manifestation being examined tend to be included, which, with the persisting trace on the screen, tends to cause undue exposure, with attendant halation, producing a poorly defined image. While it is possible in some cases to eliminate these effects by synchronizing the camera shutter with the movement of the single sweep, it is in many instances more convenient, desirable or necessary to blank out the beam before and after the recorded sweep.

An object of the invention therefore is to provide simple and efficient circuit means for completely blanking out the beam of one oscilloscope before and after the sweep, coordinated and timed automatically in proper relation to the triggering of the sweep.

A conventional cathode ray oscilloscope widely used is commonly provided with a switch by which the beam may be turned off manually. It is desirable to retain insofar as possible this switch arrangement for operating the oscilloscope in the usual manner when desired.

In accordance with the invention therefore, I have provided switch means for supplementing the action of the manually operated switch by which the beam may, under proper conditions, be turned on automatically, and in synchronization with the single sweep and yet when necessary the usual manually operated switch may be utilized without change of the prior manner of use and function of the machine.

In the accompanying drawing, I have indicated a schematic diagram of a circuit arrangement for achieving these objectives. Considering this diagram in greater detail, it will be noted that a conventional beam "on-off" switch 2 (3-blade, double throw) is indicated. This switch has two positions indicated, "beam on" and "beam off." At the "beam on" position the lowermost blade forms a connection from ground to the upper end of the coil 10, by-passing the button switch 13, while the second blade forms a connection from a shunt resistance 15 to a plus 100 volt supply 14. At the "beam off" position of the switch the two last-named blades form no connection essential in the present disclosure. The third blade of the switch in the "beam on" position of the switch forms no connection essential in this disclosure, but in the "beam off" position, completes a circuit from the junction 5 between $R_{56}$ and $R_{55}$ to the lead 18 to the "external synchronizing post" of the oscillograph of the type mentioned, two condensers 17 being connected in series between the switch and the junction 5. The beam of the oscilloscope is normally turned on by switching the grid of the CRO tube 3 from the high negative voltage end 4 of $R_{56}$ to the less negative end 5 or junction of $R_{55}$ and $R_{56}$, thus changing the bias and turning on the tube. In this manner of functioning, the resistors, $R_{56}$ and $R_{55}$, correspond to the two uppermost resistors of the conventional chain of resistors between the negative rectifier output and ground according to familiar practice in oscillographs such as named.

In accordance with the invention, this latter operation is performed automatically by using a sensitive relay 6 made up of the solenoid 10 with lower and upper contacts 7 and 8 and armature 9 shown at the left-hand side of the diagram; a special charging circuit consisting of the one-megohm resistor 11 and the 12µf. condenser 12 arranged as shown in the drawing. In addition, another shunting resistor 15, of 15 k., is connected into the second "beam on" contact of the gang switch 2, before mentioned, for shunting a large volume of current past the push button resistor 11, effective when the original beam on-off switch 2 is operated to its "on" position which causes the relay to remain closed.

The relay 6 is connected in the manner shown in the diagram and connected in series to one end of the coil of the relay is the one-megohm resistor 11 as shown leading to the B+ voltage supply 14 of approximately 100 volts and the 12µf. condenser 12 to ground. The other end of the relay coil is connected through a push button switch 13 to ground 16.

While the original beam on-off switch is in the "off" position, the 12µf. condenser 12 becomes charged through the one-megohm resistor 11 and if the push button at 13 is depressed, the relay will close just once and remain so until the 12µf. condenser is discharged sufficiently for the decay of the field at the coil to release the armature 9. The relay will not close again at 7 as long as the push button is depressed or until the 12µf. condenser is charged again. The condenser 12 thereby controls the length of time the relay is closed and the one-megohm resistor 11 controls the charging time.

It will be seen from the R. C. values given that if the condenser 12 must be charged to more than 60% of full charge before its discharge plus the current across resistor 15 can operate the relay, approximately twelve seconds' open circuit at 13 would be required before a second operation of the relay would be possible (which would then be ineffective, of course, for the full time action of coil 10 provided for by discharge of condenser 12 from full charge). An interval of approximately one minute would be required then for full charge of the condenser 12 before a second full time operation of the relay would be effective by operation of the push button switch, using the particular values given on the drawing. Substantially less than the first interval mentioned is ample to avoid liability of repeat sweep operation and double exposure in case of "flutter" or "bouncing" contact at switch 13, and ordinarily will avoid similar repetition by accidental striking of the switch before the camera shutter can be closed after action of the tube.

At the same time that the relay turns on the beam, the change of potential at 5 produces a short pulse across condensers 17, which is used to trip the single sweep by connecting through the 6000µµf. mica condensers 17 and upper blade and out point of switch 2 to the external connection of the sweep synchronizing circuit. When the original beam on-off switch 2 is turned to "on," the push button is short circuited to ground 16 by the bottom blade at switch 2 and the charging resistor 11 is shunted by 15,000 ohms so that the relay stays closed and the CRO tube and oscillograph operate normally.

There is thus provided a simple, positive and easily operated switch means for controlling the beam and excluding all light both before or after its travel across the screen with the result that much more satisfactory photographic exposure can be carried out.

While the time required for operation of the relay may be greater than the period of oscillation of the electrical manifestation under investigation, a relatively large part of this time (in relation to electronic speeds) elapses before closure of the beam firing circuit, and the opening of the relay thereafter may occur in much less than the remainder of the time for decay of the magnetic field, according to the strength of the relay spring, so that the relay itself may be closed for a very much smaller time than is required for the complete loading of the coil and its complete field decay. Consequently, a very rapid single sweep of the base deflection may be produced, with a correspondingly short duration of beam projection. The functioning of the sweep is, of course, not affected as to rate or function by the relay, because the pulse across the condensers 20 may occupy one or a few microseconds and initiate the sweep by prompt functions in the oscillograph. A discrete representation of a cycle or more or less of the investigated manifestation will then be written on the screen by the conventional prior apparatus named while the camera shutter remains open, without being affected by the duration of the pulse at 18 or action of the relay. Cut-off of the beam may be delayed after the recorded sweep, without objectionable effect, because the beam then strikes the screen outside the record area of the latter.

With the invention it is possible to simply open the camera shutter by hand immediately before pressing the button at 13, and then manually close the shutter as the button is released, although it is discretionary to use familiar electrical or other shutter operation.

While I have shown a preferred embodiment of my invention, it should be understood that various changes and modifications may be resorted to, in keeping with the spirit of the invention as defined by the appended claims.

I claim:

1. Circuit arrangement and control for supplementing the operation of the beam on-off switch of a conventional oscillograph having a cathode ray tube therein, comprising a relay having one contact in a beam blanking circuit, and an alternate contact in a beam emission circuit of said oscillograph, a separate operating potential supply line for the relay, a delay charging circuit consisting of a resistance in the line and capacitor across the line, said relay further including a shunt resistor in parallel open circuit with the first resistor, the operating circuit of the relay connected at one end between said capacitor and the two named resistors, switch means to connect the relay at its other end in series with the first resistor across the line, said first resistor having a voltage drop exceeding the normal requirement for operation of the relay, said open circuit having the shunt resistor and relay in series therein, and being connected to terminals of said on-off switch to be closed thereby at its on position.

2. The invention of claim 1 including a capacitance coupling between the said alternate contact of said relay and a single sweep trigger circuit of the oscillograph, whereby on closing of the circuit at said alternate contact, a sweep initiating pulse will be transmitted immediately following emission of the beam in the said tube.

3. In an oscillograph having a cathode ray oscilloscope tube and sweep-producing means operatively responsive to an external pulse communicated to said oscillograph, a beam-emission-control electrical source in series circuit with a beam-starting electrode of the oscilloscope tube, a two-point relay switch device having one point in series in said circuit, a more negative potential shunt circuit between a second point of said relay switch device and said source, a series resistance in said shunt circuit, a capacitance connected between said one point and the said sweep producing means, said relay device being normally closed at said second point and open at the said one point, and means to operate the switch device to its alternate condition at will, whereby the beam of said tube will be started and a sweep initiating pulse simultaneously transmitted to said sweep producing means of the oscillograph.

4. The structure of claim 3 including means to limit the closed period of the switch at said one point.

5. The structure of claim 3 in which said switch device comprises an electromagnetic relay tending, when deenergized, to open at said one point and close at the said second point, an electrical source in series with the relay capable of energizing the same, a resistance in series between the last-named source and relay sufficient to prevent operative energization of the relay in a closed circuit, a capacitance bridging the lead from the last-named resistance to the relay and the opposite polarity terminal of the last-named source having a time constant proportionate to a predetermined writing on the oscilloscope tube, and a normally open switch device operable at will connected between the said opposite terminal and the relay in series with the capacitance, whereby on operation of said last-named switch device discharge of the capacitance will operate said relay momentarily.

6. The structure of claim 5 in which said last-named switch is a button switch and said last-named resistance is sufficient to prevent charging of said capacitance to relay-operating potential for a given time greater than a predetermined period of liability of flutter contacts in such switch.

GEORGE A. ROBERTS.

REFERENCES CITED

The following references are of record in the file of this patent:

UNITED STATES PATENTS

| Number | Name | Date |
| --- | --- | --- |
| 2,119,372 | Wendt | May 31, 1938 |
| 2,280,670 | Spielman | Apr. 21, 1942 |